(12) United States Patent
Benjamin (10) Patent No.: US 7,899,660 B2
(45) Date of Patent: Mar. 1, 2011

(54) TECHNIQUE FOR DIGITAL CIRCUIT FUNCTIONALITY RECOGNITION FOR CIRCUIT CHARACTERIZATION

(75) Inventor: Ben Varkey Benjamin, Kochi (IN)

(73) Assignee: Wipro Limited, Bangalore, Karnataka (IN)

( * ) Notice: Subject to any disclaimer, the term of this patent is extended or adjusted under 35 U.S.C. 154(b) by 527 days.

(21) Appl. No.: 11/874,206

(22) Filed: Oct. 18, 2007

(65) Prior Publication Data

US 2009/0106010 A1    Apr. 23, 2009

(51) Int. Cl.
    *G06F 17/50* (2006.01)
(52) U.S. Cl. ........................................................ 703/15
(58) Field of Classification Search .................. 703/15; 716/4, 5
    See application file for complete search history.

(56) References Cited

U.S. PATENT DOCUMENTS 6,212,665 B1 * 4/2001 Zarkesh et al. ................. 716/4
2004/0156153 A1 * 8/2004 Csanky et al. ................ 361/42
2006/0114135 A1 * 6/2006 Whitaker et al. ............. 341/51

\* cited by examiner

*Primary Examiner*—Jason Proctor
*Assistant Examiner*—Andre Pierre Louis
(74) *Attorney, Agent, or Firm*—Prakash Nama; Global IP Services, PLLC (57) ABSTRACT

A method and system of digital circuit functionality recognition for circuit characterization is disclosed. In one embodiment, a method for determining the valid arcs includes receiving a truth table including state information associated with input pins and their associated output pins in the digital circuit. Valid arcs are then determined based on whether a change in each of the input pins causes a change in associated one of the output pins using the received truth table. A first arc table is then formed using state information associated with substantially the determined valid arcs. Redundant arcs are then identified in the first arc table using the associated state information. A second arc table is then formed by removing the state information associated with the redundant arcs from the first arc table.

10 Claims, 4 Drawing Sheets

TECHNIQUE FOR DIGITAL CIRCUIT FUNCTIONALITY RECOGNITION FOR CIRCUIT CHARACTERIZATION

FIELD OF THE INVENTION

The present invention relates generally to digital circuits and more particularly relates to a technique for digital circuit functionality recognition for circuit characterization.

BACKGROUND

Circuit characterization is a process of capturing a circuit performance and representing the same as a black box model. SPICE simulations are performed for various input slew and output load combinations for the timing/power arcs identified from functionality and results are typically captured as a liberty model. This liberty model provides information on circuit performance such as delays, transition time, power and input capacitance.

The liberty model captures the performance of the circuit using lookup tables with delays specified as a function of input slew and output load. Generally, these lookup tables are created for different timing arcs. A timing arc is defined as a path to an output pin from a related input pin. It is possible to have different timing arcs for the same input and output pin pair. In such cases, the timing arcs are differentiated by specifying the state under which each timing arc is valid. A state is defined by specifying secondary pins' combination for the selected timing arc.

Traditional characterization tools accept functionality in the form of a truth table or Boolean expression and generate timing arcs. However, current techniques do not provide provisions for generating optimum state dependent timing arcs. The user is expected to explicitly specify state dependent timing arcs that need to be included in the liberty model.

The algorithm used by the current characterization tools to generate dependent timing arcs is explained using a sample truth table for a 4-1 MUX. Since the full truth table contains 64 entries, for simplicity, only few entries are used in the table for illustrating the functionality of the 4-1 MUX.

TABLE 1

| S1 | S0 | A | B | C | D | : | Y |
|----|----|----|----|----|----|----|----|
| ... | ... | ... | ... | ... | ... | ... | ... |
| 0 | 0 | 0 | 0 | 0 | 1 | : | 0 |
| 0 | 0 | 0 | 0 | 1 | 0 | : | 0 |
| 0 | 0 | 0 | 1 | 0 | 0 | : | 0 |
| 0 | 0 | 1 | 0 | 0 | 0 | : | 1 |
| ... | ... | ... | ... | ... | ... | ... | ... |
| 0 | 1 | 0 | 0 | 0 | 1 | : | 0 |
| 0 | 1 | 0 | 0 | 1 | 0 | : | 0 |
| 0 | 1 | 0 | 1 | 0 | 0 | : | 1 |
| 0 | 1 | 1 | 0 | 0 | 0 | : | 0 |
| ... | ... | ... | ... | ... | ... | ... | ... |
| 1 | 0 | 0 | 0 | 0 | 1 | : | 0 |
| 1 | 0 | 0 | 0 | 1 | 0 | : | 1 |
| 1 | 0 | 0 | 1 | 0 | 0 | : | 0 |
| 1 | 0 | 1 | 0 | 0 | 0 | : | 0 |
| ... | ... | ... | ... | ... | ... | ... | ... |
| 1 | 1 | 0 | 0 | 0 | 1 | : | 1 |
| 1 | 1 | 0 | 0 | 1 | 0 | : | 0 |
| 1 | 1 | 0 | 1 | 0 | 0 | : | 0 |
| 1 | 1 | 1 | 0 | 0 | 0 | : | 0 |
| ... | ... | ... | ... | ... | ... | ... | ... |

Even though there may be multiple states for a timing arc, not all states are necessary to capture the circuit performance because of the presence of redundant arcs. Generally, redundant arcs are created by those states which do not affect the output transition for a particular input transition. For example, it can be seen from the above table 1 for the case of 4-1 MUX, the timing arc from input pin A to output pin Y is valid only if the select pin S1 and S0 are held low. Thus for the arc A-Y, any state with ($\overline{S1}\cdot S0$), ($S1\cdot\overline{S0}$) and ($S1\cdot S0$) are redundant.

For ($\overline{S1}\cdot\overline{S0}$), the conditions of the secondary pins B, C or D do not affect the output transition at pin Y for a transition at the input pin A. Thus pins B, C and D are at "don't care" (hereafter denoted by X) condition. This means that there can only be one timing arc from input pin A to output pin Y which implies that there are no states associated with this timing arc other than the one where S1 and S0 are held low. Consequently, the liberty model needs to have only one entry for the timing arc from pin A to pin Y. The timing arcs from pins B, C and D to pin Y are deduced similarly.

For the pins S1 and S0, the determination of states is not as simple. Consider the arc S1 to Y. There are 32 possible states for this arc. Some of these arcs have positive unate timing sense and some have negative unate timing sense. Binary numbers 01100 are used to represent state $\overline{S0}\cdot A\cdot B\cdot\overline{C}\cdot\overline{D}$. For the arc under consideration, consider the states 00010, 00011, 00110 and 00111. For each of these states, S1 changing from high to low or low to high causes a change in Y in the same direction. Thus the timing sense is positive unate. It can be seen from the table 2 that pins B and D have no effect on the transition at pin Y for a transition at pin S1. Thus the 4 states can be reduced to one state, i.e., to ($\overline{S0}\cdot\overline{A}\cdot C$) as shown in the following table 2 for arc S1-Y for state 00×1×. It can be seen in the following table 2 that this gives a positive unate arc for the state ($\overline{S0}\cdot\overline{A}\cdot C$).

TABLE 2

| S1 | S0 | A | B | C | D | : | Y |
|----|----|----|----|----|----|----|----|
| 0 | 0 | 0 | 0 | 1 | 0 | : | 0 |
| 0 | 0 | 0 | 0 | 1 | 1 | : | 0 |
| 0 | 0 | 0 | 1 | 1 | 0 | : | 0 |
| 0 | 0 | 0 | 1 | 1 | 1 | : | 0 |
| 1 | 0 | 0 | 0 | 1 | 0 | : | 1 |
| 1 | 0 | 0 | 0 | 1 | 1 | : | 1 |
| 1 | 0 | 0 | 1 | 1 | 0 | : | 1 |
| 1 | 0 | 0 | 1 | 1 | 1 | : | 1 |

In the above table 2, consider the same arc for a different set of states 10001, 10011, 11001, and 11011 and it can be seen that even in this case, a change in S1 causes a change in Y in the same direction. However, in this case, it is a different set of pins that are at X. For these four states, it can be seen in the following table 3 that the pins A and C have no effect on the transition at pin Y for a transition at pin S1. Consequently, the four states can be reduced to one state, i.e., ($S0\cdot\overline{B}\cdot D$). Further, it can be seen in the following table 3 that the two states ($\overline{S0}\cdot\overline{A}\cdot C$) and ($S0\cdot\overline{B}\cdot D$) cannot be simplified any further and constitute two valid states for the arc from input pin S1 to output pin Y for the same timing sense. There are two more states for the arc S1-Y with negative unate timing sense which can be derived in a similar manner as shown in the following tables 4 and 5. Table 4 illustrates arc S1-Y for state 01×0×, which gives a negative unate arc with the state ($\overline{S0}\cdot A\cdot\overline{C}$). Table 5 illustrates arc S1-Y for state 1×1×0, which gives a negative unate arc for state ($S0\cdot B\cdot\overline{D}$).

TABLE 3

| S1 | S0 | A | B | C | D | : | Y |
|----|----|---|---|---|---|---|---|
| 0  | 1  | 0 | 0 | 0 | 1 | : | 0 |
| 0  | 1  | 0 | 0 | 1 | 1 | : | 0 |
| 0  | 1  | 1 | 0 | 0 | 1 | : | 0 |
| 0  | 1  | 1 | 0 | 1 | 1 | : | 0 |
| 1  | 1  | 0 | 0 | 0 | 1 | : | 1 |
| 1  | 1  | 0 | 0 | 1 | 1 | : | 1 |
| 1  | 1  | 1 | 0 | 0 | 1 | : | 1 |
| 1  | 1  | 1 | 0 | 1 | 1 | : | 1 |

TABLE 4

| S1 | S0 | A | B | C | D | : | Y |
|----|----|---|---|---|---|---|---|
| 0  | 0  | 1 | 0 | 0 | 0 | : | 1 |
| 0  | 0  | 1 | 0 | 0 | 1 | : | 1 |
| 0  | 0  | 1 | 1 | 0 | 0 | : | 1 |
| 0  | 0  | 1 | 1 | 0 | 1 | : | 1 |
| 1  | 0  | 1 | 0 | 0 | 0 | : | 0 |
| 1  | 0  | 1 | 0 | 0 | 1 | : | 0 |
| 1  | 0  | 1 | 1 | 0 | 0 | : | 0 |
| 1  | 0  | 1 | 1 | 0 | 1 | : | 0 |

TABLE 5

| S1 | S0 | A | B | C | D | : | Y |
|----|----|---|---|---|---|---|---|
| 0  | 1  | 0 | 1 | 0 | 0 | : | 1 |
| 0  | 1  | 0 | 1 | 1 | 0 | : | 1 |
| 0  | 1  | 1 | 1 | 0 | 0 | : | 1 |
| 0  | 1  | 1 | 1 | 1 | 0 | : | 1 |
| 1  | 1  | 0 | 1 | 0 | 0 | : | 0 |
| 1  | 1  | 0 | 1 | 1 | 0 | : | 0 |
| 1  | 1  | 1 | 1 | 0 | 0 | : | 0 |
| 1  | 1  | 1 | 1 | 1 | 0 | : | 0 |

It can be seen from the above tables 2-5 that even though there may be multiple states for a timing arc, not all states are necessary to capture the circuit performance because of the presence of redundant arcs. Using current circuit characterization techniques can result in creating such redundant arcs including those states which may not affect the output transition for an associated input transition. Further, the current circuit characterization techniques fail to produce a truth table that includes substantially only the valid arcs for each pin in a circuit. Furthermore, identifying valid timing arcs and states associated with each pin is generally crucial for circuit characterization.

BRIEF DESCRIPTION OF THE DRAWINGS

Example embodiments are illustrated by way of example and not limited to the figures of the accompanying drawings, in which like references indicate similar elements and in which.

Other features of the present embodiments will be apparent from the accompanying drawings and from the detailed description that follows.

DETAILED DESCRIPTION

A method and system of digital circuit functionality recognition for circuit characterization is disclosed. In the following description, for purposes of explanation, numerous specific details are set forth in order to provide a thorough understanding of the various embodiments. It will be evident, however, to one skilled in the art that the various embodiments may be practiced without these specific details.

The terms "arc" and "timing arc" are used interchangeably throughout the document.

Figure 1:
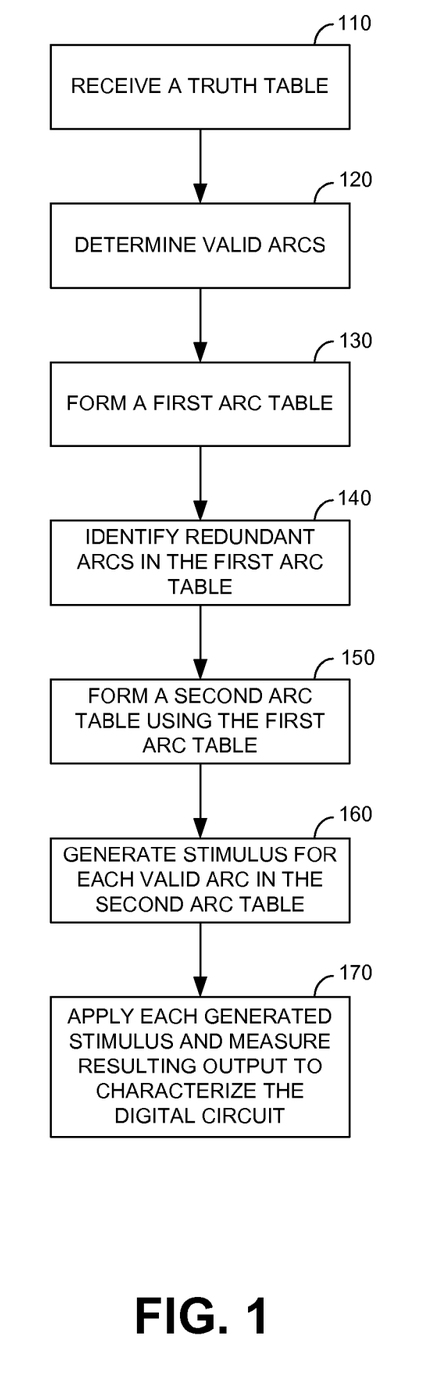
FIG. 1 is a process flow illustrating digital circuit functionality recognition technique for circuit characterization, according to one embodiment.

FIG. 1 is a process flow 100 illustrating digital circuit functionality recognition technique for circuit characterization, according to one embodiment. In operation 110, a truth table of a digital circuit is received to validate arcs. The arcs may be a path to an output pin from a related input pin. Exemplary arcs can include timing arcs, tri-state arcs, power arcs and so on. In these embodiments, the functionality recognition technique works on the whole truth table that includes all the combinations of input pins.

In operation 120, valid arcs based on whether a change in each input pin causes a change in associated output pin are determined using the received truth table. Exemplary techniques to determine whether a change in each of the input pins causes a change in associated one of the output pins include looping constructs, string comparisons, pattern matching and so on. In these embodiments, the valid arcs may be determined by identifying a change in each of the input pins that results in a change in the associated one of the output pins and declaring them as valid arcs.

In operation 130, a first arc table is formed by using substantially the determined valid arcs and the associated state information.

The following example illustrates the operations 120 and 130 using a 4-1 MUX having a truth table containing 64 entries.

In the following table 6, logic high is represented by 1 and logic low is represented by 0. The truth table associated with the digital circuit is represented as TT and a first arc table is represented as RT. For a function with M input pins, the number of states for a timing arc from an input pin to an output pin can be represented as $2^{(M-1)}$. The steps involved in the operations 120 and 130 are outlined below based on the information mentioned above.

1. Identify the input pin IP (e.g., from the M input pins) for which the timing arc needs to be validated for the output pin OP. The two possible values for IP are 1 and 0.
2. For each state in TT from among the $2^{(M-1)}$ states, check if there is a change in OP for a change in IP.
3. If there is a change, then if OP=IP, an entry is created in RT marked P against that input pin and state, and if OP=$\overline{\text{IP}}$, an entry is created in RT marked N against that input pin and state.
4. If OP is invariant, then that state is eliminated.
5. Steps 1 through 4 are repeated for each of the M input pins and RT updated as necessary.

The RT thus created is a first arc table with those states removed, for which the output pin is invariant. Note that there are no entries for output pins in this table.

RT for 4-1 MUX contains 64 entries—16 for pin S1, 16 for pin S0 and 8 each for pins A, B, C and D as shown in the following table 6 for S1–Y arc and table 7 for A–Y arc. The entries for pins S1 and S0 are similar. The entries for pins A, B, C and D will also be similar. The relevant entries in RT for the pins S1 and A are given below in the following tables 6 and 7.

TABLE 6

| S1 | S0 | A | B | C | D |
|----|----|----|----|----|----|
| P | 0 | 0 | 0 | 1 | 0 |
| P | 0 | 0 | 0 | 1 | 1 |
| P | 0 | 0 | 1 | 1 | 0 |
| P | 0 | 0 | 1 | 1 | 1 |
| N | 0 | 1 | 0 | 0 | 0 |
| N | 0 | 1 | 0 | 0 | 1 |
| N | 0 | 1 | 1 | 0 | 0 |
| N | 0 | 1 | 1 | 0 | 1 |
| P | 1 | 0 | 0 | 0 | 1 |
| P | 1 | 0 | 0 | 1 | 1 |
| N | 1 | 0 | 1 | 0 | 0 |
| N | 1 | 0 | 1 | 1 | 0 |
| P | 1 | 1 | 0 | 0 | 1 |
| P | 1 | 1 | 0 | 1 | 1 |
| N | 1 | 1 | 1 | 0 | 0 |
| N | 1 | 1 | 1 | 1 | 0 |

TABLE 7

| S1 | S0 | A | B | C | D |
|----|----|----|----|----|----|
| 0 | 0 | P | 0 | 0 | 0 |
| 0 | 0 | P | 0 | 0 | 1 |
| 0 | 0 | P | 0 | 1 | 0 |
| 0 | 0 | P | 0 | 1 | 1 |
| 0 | 0 | P | 1 | 0 | 0 |
| 0 | 0 | P | 1 | 0 | 1 |
| 0 | 0 | P | 1 | 1 | 0 |
| 0 | 0 | P | 1 | 1 | 1 |

In operation 140, redundant arcs are identified in the formed first arc table using the associated state information. In operation 150, a second arc table (ST) is formed by removing the identified redundant arcs and associated state information from the first arc table (RT). In these embodiments, the redundant arcs can be identified from the created RT table (e.g., table 6 and/or table 7). The following running example further explains the operations 140 and 150. For example, in the case of 4-1 MUX, for input pin A, the state combinations 00000, 00001, 00010, 00011, 00100, 00101, 00110, 00111 (i.e., for pins S1, S0, B, C and D in that order) can be simplified to one state ($\overline{S1 \cdot S0}$) due to the reason that the timing arcs are equivalent for all possible combinations of pins B, C and D. Therefore, the pins B, C and D are at X (i.e., don't care) condition. Further, the second pass involves elimination of the identified redundant entries.

The first arc table (RT) created in the first pass is analysed to reduce the multiple states for a particular timing arc and a second arc table (ST) is created. This is done by checking for pins that can be converted to X. The steps involved in the second pass are explained below with each pin having a valid value of P, N, 0, 1 or X.

1. Identify the input pin IP for which the states need to be reduced. A state for IP is obtained from those entries in the first arc table (RT), which have a P or N value against that IP.
2. For each state s, identify the state s', such that the hamming distance between s and s' is 1. Values P, N, 0, 1 and X are distinct and valid when calculating the hamming distance.
3. For a state pair s-s' thus obtained, identify the pin which is different in the pair and create an entry in a second arc table (ST) for that state with the different pin marked as X.
4. A state s, for which a valid s' cannot be identified in step 2 is inserted into ST without any change.
5. Steps 1 through 4 are repeated for each of the M input pins.
6. Step 5 is repeated with RT substituted with ST at each iteration. The steps in the process are repeated till no further reduction of RT is possible (i.e., till ST≡RT). The following table 8 shows the ST for 4-1 MUX.

TABLE 8

| S1 | S0 | A | B | C | D |
|----|----|----|----|----|----|
| P | 0 | 0 | X | 1 | X |
| N | 0 | 1 | X | 0 | X |
| P | 1 | X | 0 | X | 1 |
| N | 1 | X | 1 | X | 0 |
| 0 | P | 0 | 1 | X | X |
| 0 | N | 1 | 0 | X | X |
| 1 | P | X | X | 0 | 1 |
| 1 | N | X | X | 1 | 0 |
| 0 | 0 | P | X | X | X |
| 0 | 1 | X | P | X | X |
| 1 | 0 | X | X | P | X |
| 1 | 1 | X | X | X | P |

In operation 160, stimulus is generated for each valid arc that can be formed using the state information in the second arc table (ST), as shown in table 8. In operation 170, the generated stimulus is applied to each valid arc and a result obtained is then used in characterizing the digital circuit.

Figure 2:
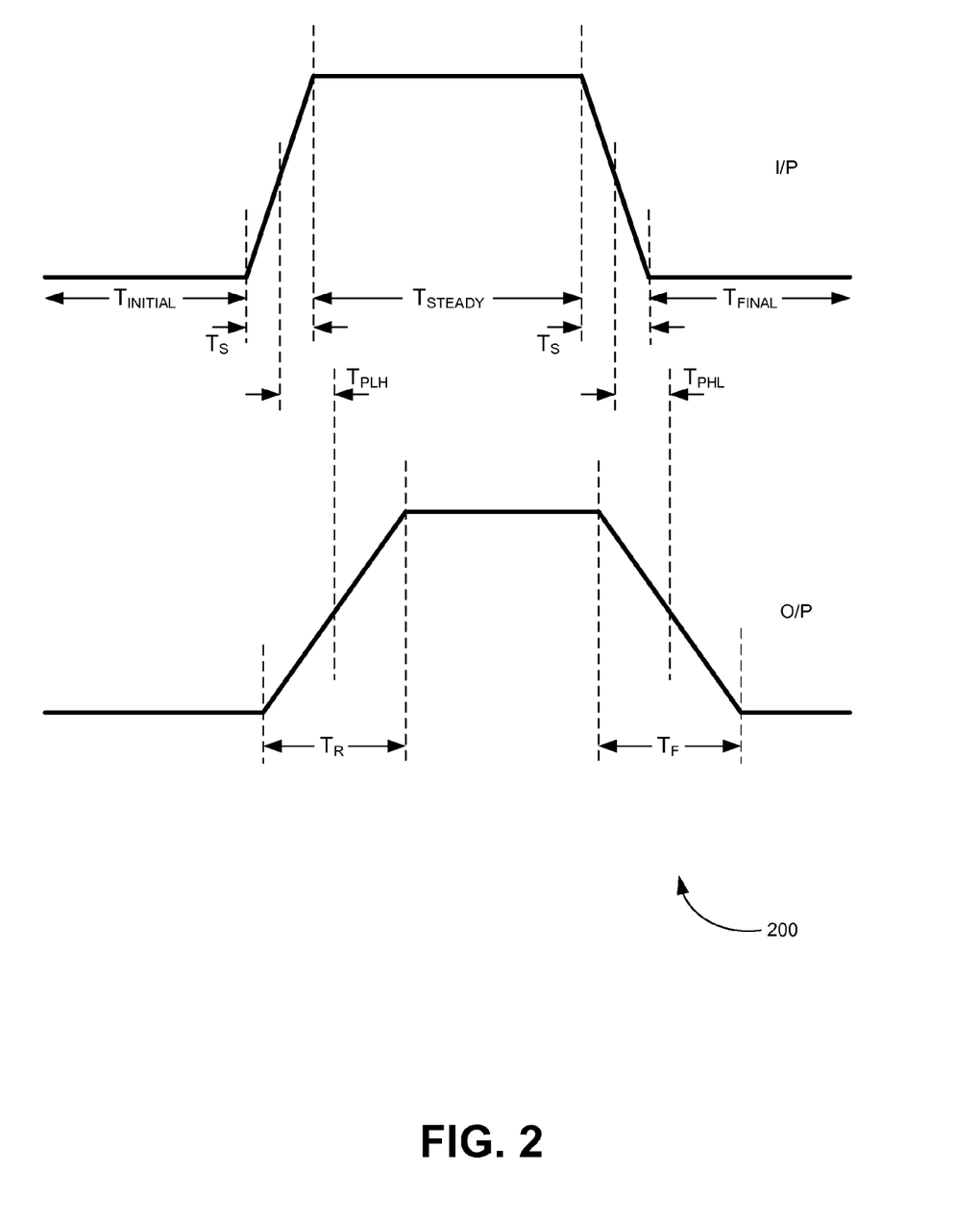
FIG. 2 is a timing illustrating stimulus generation for an input pin with value P, according to one embodiment.

FIG. 2 is a timing diagram 200 illustrating stimulus generation for an input pin with value P, according to one embodiment. In the example embodiment illustrated in FIG. 2, the timing diagram 200 illustrates an exemplary scheme of stimulus generation and measurement for an input pin with a value P.

Figure 3:
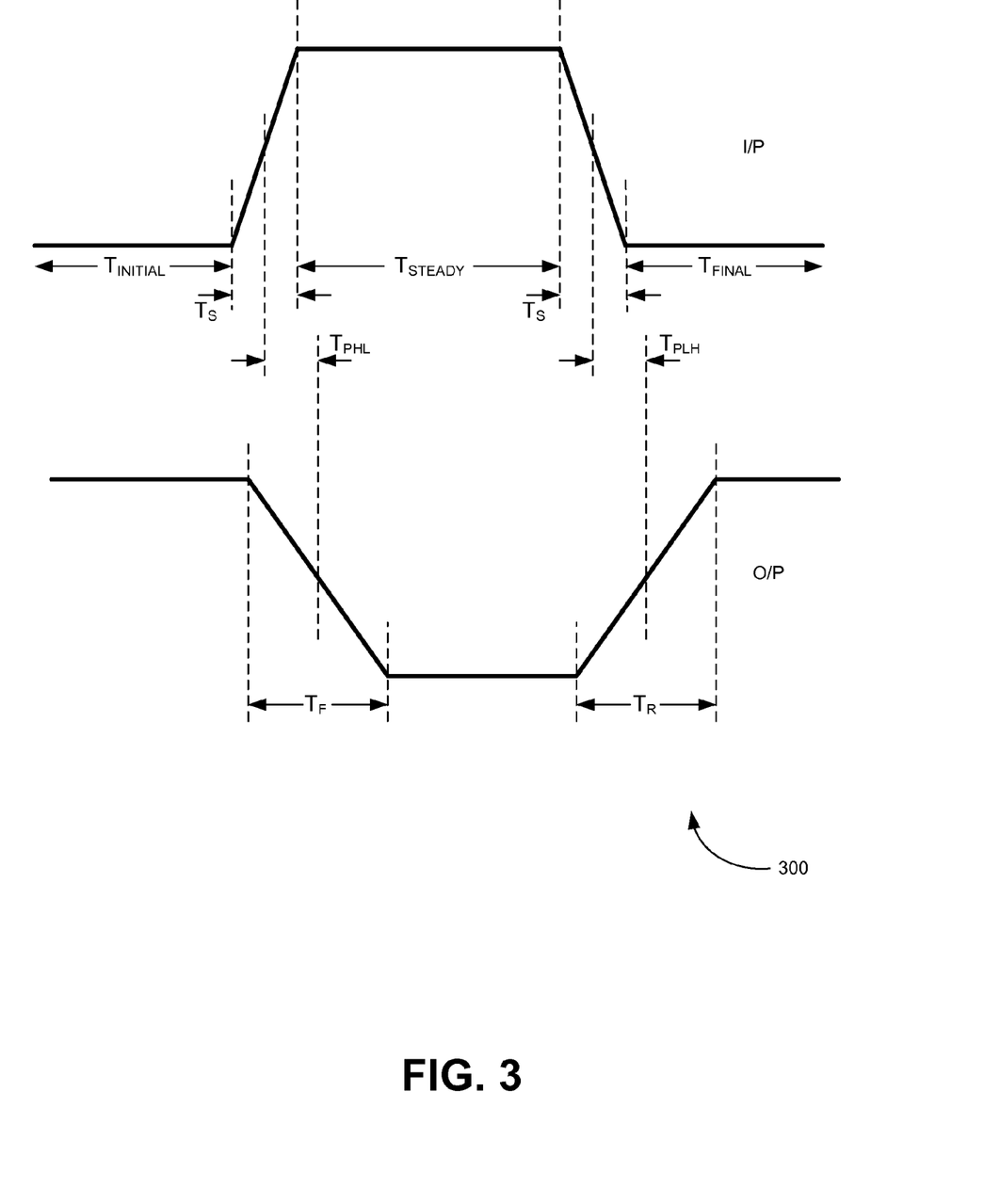
FIG. 3 is a timing diagram illustrating stimulus generation for an input pin with value N, according to one embodiment.

FIG. 3 is a timing diagram 300 illustrating stimulus generation for an input pin with value N, according to one embodiment. In the example embodiment illustrated in FIG. 3, the timing diagram 300 illustrates an exemplary scheme of stimulus generation and measurement for an input pin with a value N.

The stimulus generation for an input pin with values P and N illustrated in the timing diagram of FIGS. 2 and 3 is explained below with respect to the second arc table (ST) (i.e., table 8). From the second arc table (ST) as shown in table 8, it can be observed that, for a particular input pin if more than one state exists in the ST, then each of these states constitutes a valid state for that timing arc.

For each entry in the second arc table (ST), the following interpretation holds good:

An input pin is identified by a P or an N against it.

For an identified input pin, if there is more than one entry in the ST, then each of these entries constitutes a state for the timing arc from that input pin to the output pin. Consequently for these timing arcs, the liberty model will have 'when' and 'sdf_cond' entries against them.

For those pins which do not have multiple entries, there is only arc from that input pin to the output pin. Consequently the liberty model will not have 'when' or 'sdf_cond' entries against them.

For a timing arc, and states if any, (e.g., identified as per the above discussion), the relation between the input pin and the output pin is obtained from the entry corresponding to the input pin in the ST. This forms the basis for stimulus generation and measurement.

If the entry for an input pin is P, then an input transition from 0 to 1 causes a change at the output from 0 to 1. Similarly, an input transition from 1 to 0 causes an output transition from 1 to 0.

If the entry for an input pin is N, then an input transition from 0 to 1 causes a change at the output from 1 to 0. Similarly, an input transition from 1 to 0 causes an output transition from 0 to 1.

From the above interpretation, for any timing arc and states associated with it, the stimulus generation and measurement may be done in any convenient manner. A possible method for the input pins identified by a P entry (e.g., as illustrated in FIG. 2) or an N entry (e.g., as illustrated in FIG. 3) is explained below:

Consider the variables, $T_s$, $T_{initial}$, $T_{steady}$, $T_{final}$ that represent the input slew, the time from the beginning of simulation to the first input transition, the time from the first transition to the second transition and the time from the second transition to the end of simulation respectively.

The input pin is assumed to be at 0 at the beginning of the simulation. First transition from 0 to 1 occurs at $T_{initial}$ and second transition from 1 to 0 occurs at $T_{initial}+T_s+T_{steady}$. The simulation is completed at $T_{initial}+T_s+T_{steady}+T_s+T_{final}$.

For an input pin with value P (e.g., as illustrated in FIG. 2), the rise_transition ($t_r$) and cell_rise ($t_{plh}$) are measured after $T_{initial}$ with a suitable window specified. Further, the fall_tranistion ($t_f$) and cell_fall ($t_{phl}$) are measured after $T_{initial}+T_s+T_{steady}$, again with a suitable window specified in FIG. 2.

For an input pin with value N (e.g., as illustrated in FIG. 3), the fall_transition ($t_f$) and cell_fall ($t_{phl}$) are measured after $T_{initial}$ with a suitable window specified. Further, the rise_tranistion ($t_r$) and cell_rise ($t_{pth}$) are measured after $T_{initial}+T_s+T_{steady}$, again with a suitable window specified in FIG. 3.

Figure 4:
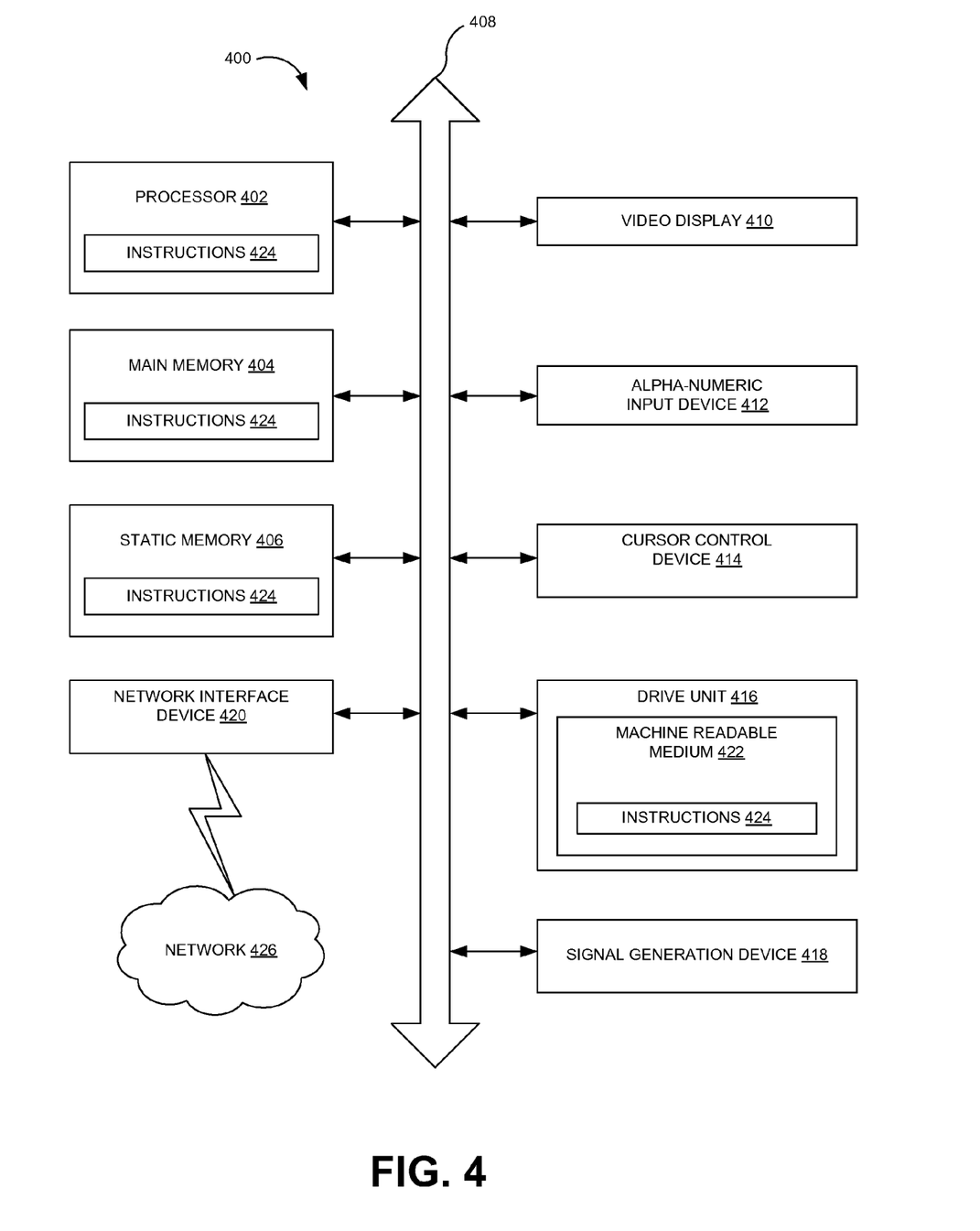
FIG. 4 is a diagrammatic system view of a data processing system in which any of the embodiments disclosed herein may be performed, according to one embodiment.

FIG. 4 is a diagrammatic system view 400 of a data processing system in which any of the embodiments disclosed herein may be performed, according to one embodiment. Particularly, the diagrammatic system view of FIG. 4 illustrates a processor 402, a main memory 404, a static memory 406, a bus 408, a video display 410, an alpha-numeric input device 412, a cursor control device 414, a drive unit 416, a signal generation device 418, a network interface device 420, a machine readable medium 422, instructions 424 and a network 426, according to one embodiment.

The diagrammatic system view 400 may indicate a personal computer and/or a data processing system in which one or more operations disclosed herein are performed. The processor 402 may be a microprocessor, a state machine, an application specific integrated circuit, a field programmable gate array, etc. (e.g., Intel® Pentium® processor). The main memory 404 may be a dynamic random access memory and/or a primary memory of a computer system. The static memory 406 may be a hard drive, a flash drive, and/or other memory information associated with the data processing system.

The bus 408 may be an interconnection between various circuits and/or structures of the data processing system. The video display 410 may provide graphical representation of information on the data processing system. The alpha-numeric input device 412 may be a keypad, keyboard and/or any other input device of text (e.g., a special device to aid the physically handicapped). The cursor control device 414 may be a pointing device such as a mouse. The drive unit 416 may be a hard drive, a storage system, and/or other longer term storage subsystem.

The signal generation device 418 may be a bios and/or a functional operating system of the data processing system. The network interface device 420 may perform interface functions (e.g., code conversion, protocol conversion, and/or buffering) required for communications to and from the network 426 between a number of independent devices (e.g., of varying protocols). The machine readable medium 422 may provide instructions on which any of the methods disclosed herein may be performed. The instructions 424 may provide source code and/or data code to the processor 402 to enable any one or more operations disclosed herein.

For example, a storage medium having instructions, that when executed by a computing platform executes a method for circuit characterization, includes receiving a truth table associated with the digital circuit, determining valid arcs and their associated state information based on whether a change in each of the input pins results in a change in one of the output pins using the truth table, and forming a first arc table using the valid arcs and their associated state information.

In addition, the storage medium may have instructions to identify redundant arcs in the first arc table using the associated state information, and to form a second arc table by removing the identified redundant arcs and associated state information from the first arc table. The storage medium may also have instructions generate stimulus for each valid arc in the second traduced truth table, and apply the generated stimulus to each valid arc and measuring resulting output to characterize the digital circuit. In these embodiments, the arcs may include paths selected from the group consisting of timing arcs, and power arcs in the truth table.

Furthermore, a computer system includes a processor and a memory coupled to the processor. The memory has code stored therein for determining valid arcs in a digital circuit. The code causes the processor to perform a method of circuit characterization includes receiving a truth table associated with the digital circuit, determining valid arcs and their associated state information based on whether a change in each of the input pins results in a change in one of the output pins using the truth table, and forming a first arc table using the valid arcs and their associated state information.

The code causes the processor to identify redundant arcs in the first arc table using the associated state information, and forming a second arc table by removing the identified redundant arcs and associated state information from the first arc table. In addition, the code causes the processor to generate stimulus for each valid arc in the second traduced truth table, and applying the generated stimulus to each valid arc and measuring resulting output to characterize the digital circuit.

The above technique can be used to identify relationship between various input and output pins such that the timing arcs and the states under which the arcs are valid are identified. In one embodiment, the above technique eliminates entries for the output pins and the resultant first arc table RT (e.g., as illustrated in table 6 and 7) is easily stored as an array. In these embodiments, the high-level programming languages may have provisions for manipulating arrays. Further, the above technique can be implemented using looping constructs, string comparisons, pattern matching techniques and so on.

In another embodiment, the above technique enables array implementation of RT to perform the second pass. Further, representation of a second arc table (ST) (e.g., as illustrated in table 8) may facilitate easy interpretation of the data to generate stimulus and measurement decks. In these embodiments, the stimulus generation and measurement can be done for any simulator upon identifying the functionality. In some embodiments, accuracy of the circuit characterization depends on the proper selection of the timing arcs.

The above technique for functionality recognition for the circuit characterization may be iterative in nature and can be easily implemented using any high level programming language.

The above described algorithm works on the whole truth table with all possible combinations of the specified input pins. For example, if the truth table contains X conditions, the algorithm needs to be expanded to include all the X conditions before applying the algorithm. Even though the above technique is described by using a single output pin it can envisioned that any number of output pins can be used to identify the valid arcs. Further, it can also be envisioned that the above algorithm can be used for tri-state timing arcs and power arcs in a truth table as well.

The above technique characterizes a circuit by identifying a substantially minimum number of arcs and states for which characterizations need to be performed to capture the functionality and performance.

Also, the above-described method may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method performed by a processor for characterizing a digital circuit including input pins and associated output pins, comprising:
    receiving a truth table associated with the digital circuit to validate arcs by the processor, wherein each arc includes a path to an output pin from an associated input pin;
    determining, by the processor, valid arcs and their associated state information by identifying a change in each of the input pins that results in a change in associated one of the output pins using the truth table and declaring them as the valid arcs;
    forming a first arc table using the valid arcs and their associated state information by the processor;
    identifying redundant arcs in the first arc table using the associated state information wherein the redundant arcs include those states which do not affect an output transition at the output pin for a transition at the associated input pin;
    forming a second arc table by removing the identified redundant arcs and associated state information from the first arc table; wherein forming the second arc table by removing the identified redundant arcs and associated state information from the first arc table comprises: identifying an input pin for which states need to be reduced, wherein the states for the input pin are obtained from entries in the first arc table; identifying a valid state s' for each state s such that hamming distance between s and s' is 1, if a valid s' is identified for a state s, then for each state pair s-s' thus identified, identifying a pin which is different in the state pair and creating an entry in the second arc table for that state with the different pin marked as don't care 'X', if a valid s' cannot be identified for a state s, then inserting that state s into the second arc table without any change in the output pins; and repeating the steps of identifying an input pin, identifying a valid state s', identifying a pin, and inserting for each of the input pins; and repeatedly substituting the first arc table with the second arc table at each iteration;
    generating stimulus for each valid arc in the second arc table; and
    applying the generated stimulus to each valid arc and measuring resulting output to characterize the digital circuit.

2. The method of claim 1, wherein forming the first arc table comprises:
    forming the first arc table by using the valid arcs and associated state information and relationship between the associated input pins and output pins.

3. The method of claim 1, wherein identifying the change in each of the input pins that results in a change in associated one of the output pins comprises:
    identifying the change in each of the input pins that results in a change in associated one of the output pins using techniques selected from the group consisting of looping constructs, string comparisons, and pattern matching.

4. The method of claim 1, wherein the arcs comprise paths selected from the group consisting of timing arcs, and power arcs in the truth table.

5. An article, comprising:
    a storage medium having instructions, that when executed by a computing platform, result in execution of a method of characterizing a digital circuit including input pins and associated output pins, comprising:
    receiving a truth table associated with the digital circuit to validate arcs, wherein each arc includes a path to an output pin from an associated input pin;
    determining valid arcs and their associated state information by identifying a change in each of the input pins that results in a change in associated one of the output pins using the truth table and declaring them as the valid arcs;
    forming a first arc table using the valid arcs and their associated state information;
    identifying redundant arcs in the first arc table using the associated state information wherein the redundant arcs include those states which do not affect an output transition at the output pin for a transition at the associated input pin;
    forming a second arc table by removing the identified redundant arcs and associated state information from the first arc table; wherein forming the second arc table by removing the identified redundant arcs and associated state information from the first arc table comprises: identifying an input pin for which states need to be reduced, wherein the states for the input pin are obtained from entries in the first arc table; identifying a valid state s' for each state s such that hamming distance between s and s' is 1, if a valid s' is identified for a state s, then for each state pair s-s' thus identified, identifying a pin which is different in the state pair and creating an entry in the second arc table for that state with the different pin marked as don't care 'X', if a valid s' cannot be identified for a state s, then inserting that state s into the second arc table without any change in the output pins; and repeating the steps of identifying an input pin, identifying a valid state s', identifying a pin, and inserting for each of the input pins; and repeatedly substituting the first arc table with the second arc table at each iteration;

generating stimulus for each valid arc in the second arc table; and applying the generated stimulus to each valid arc and measuring resulting output to characterize the digital circuit.

6. The article of claim 5, wherein forming the first arc table comprises:

forming the first arc table by using the valid arcs and associated state information and relationship between the associated input pins and output pins.

7. The article of claim 5, wherein identifying the change in each of the input pins that results in a change in associated one of the output pins comprises:

identifying the change in each of the input pins that results in a change in associated one of the output pins using techniques selected from the group consisting of looping constructs, string comparisons, and pattern matching.

8. The article of claim 5, wherein the arcs comprise paths selected from the group consisting of timing arcs, and power arcs in the truth table.

9. A computer system, comprising:

a processor; and a memory coupled to the processor, the memory having stored therein code for characterizing a digital circuit including input pins and associated output pins, the code causes the processor to perform a method comprising:

receiving a truth table associated with the digital circuit to validate arcs, wherein each arc includes a path to an output pin from an associated input pin;

determining valid arcs and their associated state information by identifying a change in each of the input pins that results in a change in associated one of the output pins using the truth table and declaring them as the valid arcs;

forming a first arc table using the valid arcs and their associated state information;

identifying redundant arcs in the first arc table using the associated state information wherein the redundant arcs include those states which do not affect an output transition at the output pin for a transition at the associated input pin;

forming a second arc table by removing the identified redundant arcs and associated state information from the first arc table; wherein forming the second arc table by removing the identified redundant arcs and associated state information from the first arc table comprises: identifying an input pin for which states need to be reduced, wherein the states for the input pin are obtained from entries in the first arc table; identifying a valid state s' for each state s such that hamming distance between s and s' is 1, if a valid s' is identified for a state s, then for each state pair s-s' thus identified, identifying a pin which is different in the state pair and creating an entry in the second arc table for that state with the different pin marked as don't care 'X', if a valid s' cannot be identified for a state s, then inserting that state s into the second arc table without any change in the output pins; and repeating the steps of identifying an input pin, identifying a valid state s', identifying a pin, and inserting for each of the input pins; and repeatedly substituting the first arc table with the second arc table at each iteration;

generating stimulus for each valid arc in the second arc table; and applying the generated stimulus to each valid arc and measuring resulting output to characterize the digital circuit.

10. The system of claim 9, wherein forming the first arc table comprises:

forming the first arc table by using the valid arcs and associated state information and relationship between the associated input pins and output pins.

* * * * *